(12) United States Patent
Saunders et al.

(10) Patent No.: US 7,844,122 B2
(45) Date of Patent: Nov. 30, 2010

(54) CHROMA TEMPORAL RATE REDUCTION AND HIGH-QUALITY PAUSE SYSTEM AND METHOD

(75) Inventors: Steven E. Saunders, Cupertino, CA (US); Krasimir D. Kolarov, Menlo Park, CA (US); William C. Lynch, Palo Alto, CA (US)

(73) Assignee: Droplet Technology, Inc., Palo Alto, CA (US)

( * ) Notice: Subject to any disclaimer, the term of this patent is extended or adjusted under 35 U.S.C. 154(b) by 2032 days.

(21) Appl. No.: 10/447,514

(22) Filed: May 28, 2003

(65) Prior Publication Data

US 2003/0235340 A1     Dec. 25, 2003

Related U.S. Application Data

(63) Continuation-in-part of application No. 10/418,363, filed on Apr. 17, 2003.

(60) Provisional application No. 60/390,345, filed on Jun. 21, 2002, provisional application No. 60/390,492, filed on Jun. 21, 2002.

(51) Int. Cl.
*G06K 9/36* (2006.01)
*G06K 9/46* (2006.01)

(52) U.S. Cl. .................................................... 382/239

(58) Field of Classification Search .................. 382/240
See application file for complete search history.

(56) References Cited

U.S. PATENT DOCUMENTS

| | | | | |
|---|---|---|---|---|
| 4,561,012 A | * | 12/1985 | Acampora | 348/612 |
| 4,979,041 A | * | 12/1990 | Schreiber | 375/240.25 |
| 5,003,377 A | * | 3/1991 | Lippman et al. | 348/432.1 |
| 5,893,145 A | | 4/1999 | Thayer et al. | 711/125 |
| 6,125,201 A | * | 9/2000 | Zador | 382/166 |
| 6,141,673 A | | 10/2000 | Thayer et al. | 708/402 |
| 6,144,773 A | | 11/2000 | Kolarov et al. | 382/240 |
| 6,148,110 A | | 11/2000 | Yajima et al. | 382/240 |
| 6,195,465 B1 | | 2/2001 | Zandi et al. | 382/248 |
| 6,229,929 B1 | | 5/2001 | Lynch et al. | 382/268 |
| 6,272,180 B1 | | 8/2001 | Lei | 375/240.16 |
| 6,332,043 B1 | | 12/2001 | Ogata | 382/240 |
| 6,360,021 B1 | | 3/2002 | McCarthy et al. | 382/254 |
| 6,381,280 B1 | | 4/2002 | Lynch et al. | 375/240.19 |
| 6,396,948 B1 | | 5/2002 | Lynch et al. | 382/166 |
| 6,407,747 B1 | | 6/2002 | Chui et al. | 345/660 |
| 6,516,030 B1 | | 2/2003 | Lynch et al. | 375/240.11 |
| 6,650,773 B1 | * | 11/2003 | Maurer et al. | 382/166 |

(Continued)

OTHER PUBLICATIONS

Kolarov et al., "Video Compression for the Portable and Wireless Markets," Dec. 2002, Droplet Technology, Inc., White Paper.

(Continued)

*Primary Examiner*—Yuzhen Ge
(74) *Attorney, Agent, or Firm*—Jones IP Group

(57) ABSTRACT

A system and method are provided for compressing data. In use, luminescence data of a frame is updated at a first predetermined rate, while chrominance data of the frame is updated at a second predetermined rate that is less than the first predetermined rate. Moreover, pause information may be inserted with the compressed data, where the pause information may be used when the video data is paused during the playback thereof to increase the quality of a still frame.

4 Claims, 6 Drawing Sheets

U.S. PATENT DOCUMENTS 6,990,246 B1 * 1/2006 Ferguson .................. 382/240

OTHER PUBLICATIONS

D. LeGall and A. Tabatabai, "Sub-band coding of digital images using symmetric short kernel filters and arithmetic coding techniques", IEEE International Conference on Acoustics, Speech and Signal Processing, New York, NY, pp. 761-765, 1988.

ISO/IEC 15444-1 JPEG 2000 image coding system—Part 1: Core coding system, Mar. 2000.

R. Crochiere and L. Rabiner, Multirate Digital Signal Processing, Prentice Hall 1983.

ISO/IEC JTC 1/SC 29/WG 1 N1646 Coding of Still Pictures, Mar. 16, 2000.

ISO/IEC 11172-2:1993 Coding of moving pictures and audio at up to 1,5 Mbit/s—Part 2: Video.

ISO/IEC 10918-1 Digital compression and coding of continuous-tone still images: Requirements and guidelines, 1992.

ISO/IEC 13818-2:1995 Coding of moving pictures and associated audio: Part 2. Video.

ISO/IEC 14496-2 MPEG-4 Part 2: Visual, Apr. 1999.

* cited by examiner

CHROMA TEMPORAL RATE REDUCTION AND HIGH-QUALITY PAUSE SYSTEM AND METHOD

RELATED APPLICATION(S)

The present application is a continuation-in-part of a patent application filed Apr. 17, 2003 under Ser. No. 10/418,863 and naming the same inventors, and claims priority from a first provisional application filed Jun. 21, 2002 under Ser. No. 60/390,345, and a second provisional application filed Jun. 21, 2002 under Ser. No. 60/390,492, which are each incorporated herein by reference in their entirety.

FIELD OF THE INVENTION

The present invention relates to data compression, and more particularly to compressing visual data.

BACKGROUND OF THE INVENTION

Video "codecs" (compressor/decompressor) are used to reduce the data rate required for data communication streams by balancing between image quality, processor requirements (i.e. cost/power consumption), and compression ratio (i.e. resulting data rate). The currently available compression approaches offer a different range of trade-offs, and spawn a plurality of codec profiles, where each profile is optimized to meet the needs of a particular application.

Lossy digital video compression systems operate on digitized video sequences to produce much smaller digital representations. The reconstructed visible result looks much like the original video but may not generally be a perfect match. For these systems, it is important that the information lost in the process correspond to aspects of the video that are not easily seen or not readily noticed by viewers.

A typical digital video compression system operates in a sequence of stages, comprising a transform stage, a quantization stage, and an entropy-coding stage. Some compression systems such as MPEG and other DCT-based codec algorithms add other stages, such as a motion compensation search, etc. 2D and 3D Wavelets are current alternatives to the DCT-based codec algorithms. Wavelets have been highly regarded due to their pleasing image quality and flexible compression ratios, prompting the JPEG committee to adopt a wavelet algorithm for its JPEG2000 still image standard.

When using a wavelet transform as the transform stage in a video compressor, such algorithm operates as a sequence of filter pairs that split the data into high-pass and low-pass components or bands. Standard wavelet transforms operate on the spatial extent of a single image, in 2-dimensional fashion. The two dimensions are handled by combining filters that work horizontally with filters that work vertically. Typically, these alternate in sequence, H-V-H-V, though strict alternation is not necessary. It is known in the art to apply wavelet filters in the temporal direction as well: operating with samples from successive images in time. In addition, wavelet transforms can be applied separately to brightness or luminance (luma) and color-difference or chrominance (chroma) components of the video signal.

One may use a DCT or other non-wavelet spatial transform for spatial 2-D together with a wavelet-type transform in the temporal direction. This mixed 3-D transform serves the same purpose as a 3-D wavelet transform. It is also possible to use a short DCT in the temporal direction for a 3-D DCT transform.

The temporal part of a 3-D wavelet transform typically differs from the spatial part in being much shorter. Typical sizes for the spatial transform are 720 pixels horizontally and 480 pixels vertically; typical sizes for the spatial transform are two, four, eight, or fifteen frames. These temporal lengths are smaller because handling many frames results in long delays in processing, which are undesirable, and requires storing frames while they are processed, which is expensive.

When one looks at a picture or a video sequence to judge its quality, or when one visually compares two pictures or two video sequences, some defects or differences are harder to detect than others. This is a consequence of the human visual system having greater sensitivity for some aspects of what one sees than for others. For instance, one may see very fine details only when they are at high contrast, but can see medium-scale details which are very subtle in contrast. These differences are important for compression. Compression processes are designed to make the differences and errors as unnoticeable as possible. Thus, a compression process may produce good fidelity in the middle sizes of brightness contrast, while allowing more error in fine details.

There is thus a continuing need to exploit various psychophysics opportunities to improve compression algorithms, without significantly sacrificing perceived quality.

The foregoing compression systems are often used in Personal Video Recorders, Digital Video Recorders, Cable Set-Top Boxes, and the like. A common feature of these applications and others is that users have the possibility of pausing the video, keeping a single frame displayed for an extended time as a still image.

It is known in the art to process a video sequence, or other sequence of images, to derive a single image of higher resolution than the input images. This processing is very expensive in computing, however, as it must identify or match moving objects in the scene, camera motion, lighting shifts, and other changes and compensate for each change individually and in combination. Contemporary applications, however, do not presently support such computational extravagance for a simple pause function.

There is thus a continuing need to exploit various psychophysics opportunities to present a paused image that is of substantially higher visual quality than would be produced by simply repeating a frame of decompressed video.

DISCLOSURE OF THE INVENTION

A system and method are provided for compressing data. In use, luminescence data of a frame is updated at a first predetermined rate, while chrominance data of the frame is updated at a second predetermined rate that is less than the first predetermined rate.

Thus, the amount of compression is increased. To accomplish this, in one embodiment, one or more frequency bands of the chrominance data may be omitted. Moreover, the one or more frequency bands may be omitted utilizing a filter. Such filter may include a wavelet filter. Thus, upon the decompression of the video data, the omitted portions of the chrominance data may be interpolated.

Another system and method are provided for compressing data. Such system and method involves compressing video data, and inserting pause information with the compressed data. Thus, the pause information is used when the video data is paused during the playback thereof.

In one embodiment, the pause information may be used to improve a quality of the played back video data during a pause operation. Moreover, the pause information may include a

DESCRIPTION OF THE PREFERRED EMBODIMENTS

Figure 1:
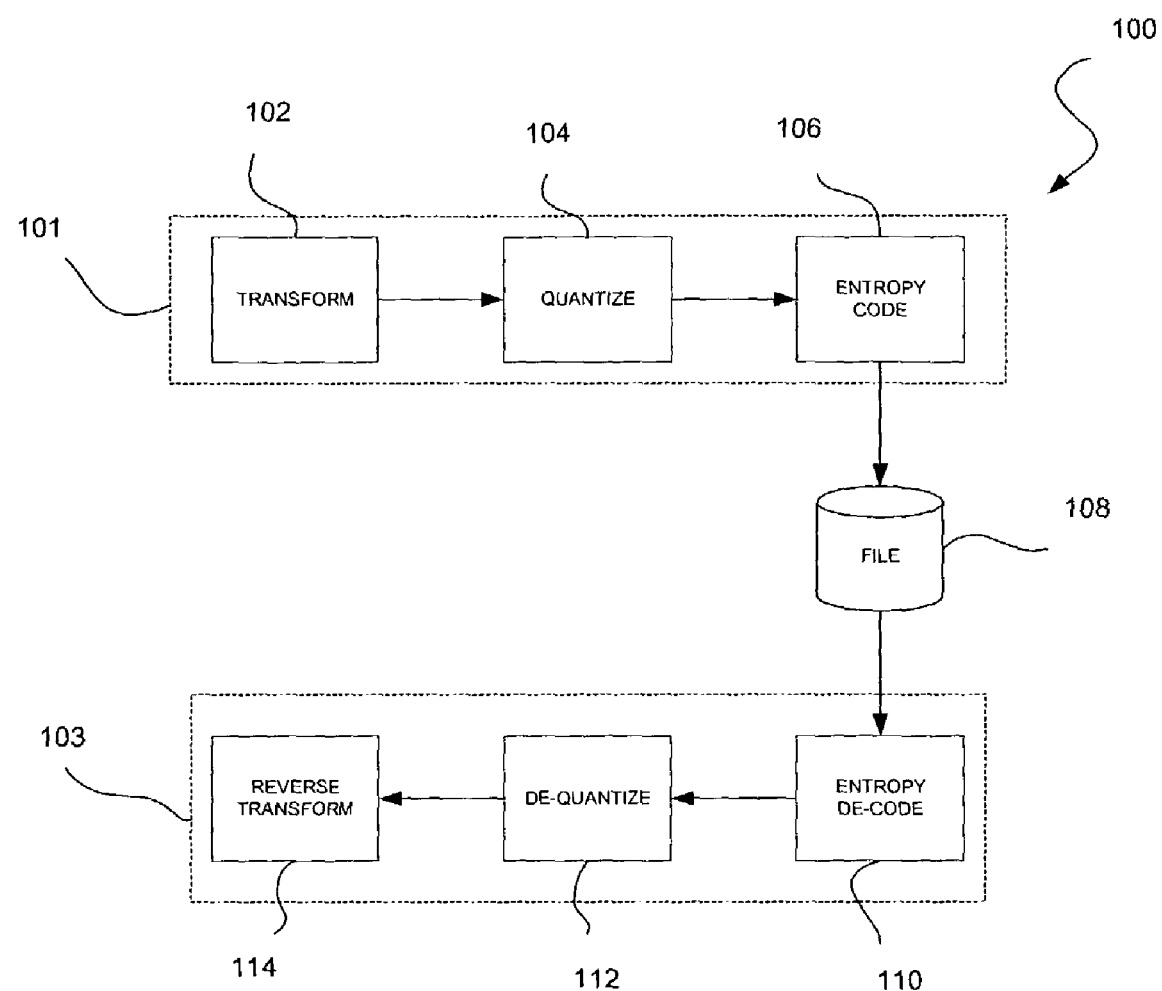
FIG. 1 illustrates a framework for compressing/decompressing data, in accordance with one embodiment.

FIG. 1 illustrates a framework 100 for compressing/decompressing data, in accordance with one embodiment. Included in this framework 100 are a coder portion 101 and a decoder portion 103, which together form a "codec." The coder portion 101 includes a transform module 102, a quantizer 104, and an entropy encoder 106 for compressing data for storage in a file 108. To carry out decompression of such file 108, the decoder portion 103 includes a reverse transform module 114, a de-quantizer 111, and an entropy decoder 110 for decompressing data for use (i.e. viewing in the case of video data, etc).

In use, the transform module 102 carries out a reversible transform, often linear, of a plurality of pixels (i.e. in the case of video data) for the purpose of de-correlation. Next, the quantizer 104 effects the quantization of the transform values, after which the entropy encoder 106 is responsible for entropy coding of the quantized transform coefficients. The various components of the decoder portion 103 essentially reverse such process.

Figure 2:
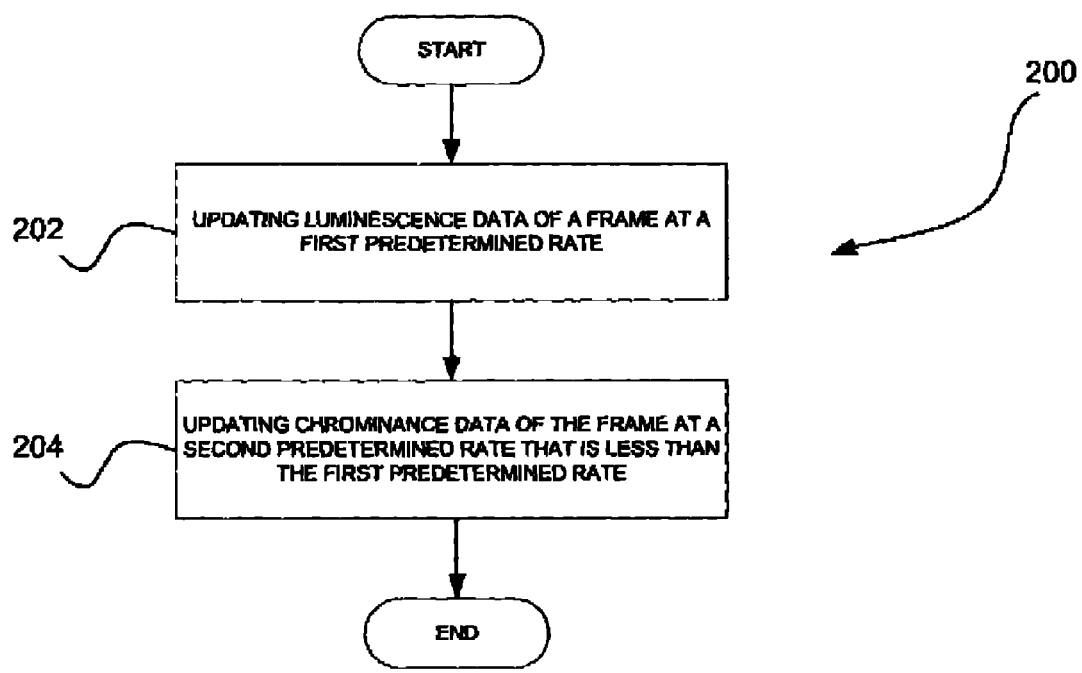
FIG. 2 illustrates a method for compressing data with chrominance (chroma) temporal rate reduction, in accordance with one embodiment.

FIG. 2 illustrates a method 200 for compressing data with chrominance temporal rate reduction, in accordance with one embodiment. In one embodiment, the present method 200 may be carried out in the context of the transform module 102 of FIG. 1 and the manner in which it carries out a reversible transform. It should be noted, however, that the method 200 may be implemented in any desired context.

In operation 202, luminescence (luma) data of a frame is updated at a first predetermined rate. In operation 204, chrominance (chroma) data of the frame is updated at a second predetermined rate that is less than the first predetermined rate.

In a digital video compression system, it is thus possible to vary the effective rate of transmitting temporal detail for different components of the scene. For example, one may arrange the data stream so that some components of the transformed signal are sent more frequently than others. In one example of this, one may compute a three-dimensional (spatial+temporal) wavelet transform of a video sequence, and transmit the resulting luma coefficients at the full frame rate.

Moreover, one may omit one or more higher-frequency bands from the chroma signal, thus in effect lowering the temporal response rate—the temporal detail fidelity—of the video for chroma information. During reconstruction of the compressed video for viewing, one may fill in or interpolate the omitted information with an approximation, rather than showing a "zero level" where there was no information transmitted. This may be done in the same way as for omitted spatial detail. Most simply it can be done by holding the most-recently received level until new information is received. More generally, it can be done by computing an inverse wavelet filter, using zero or some other default value for the omitted information, to produce a smoothed variation with the correct overall level but reduced temporal detail.

One particular example of this sort of chroma rate compression is as follows: for the chroma components, one may compute an average across two frames (four fields) of the spatially transformed chroma values. This may be accomplished by applying a double Haar wavelet filter pair and discarding all but the lowest frequency component. One may transmit only this average value. On reconstruction, one can hold the received value across two frames (four fields) of chroma. It has been found that viewers do not notice this, even when they are critically examining the compression method for flaws.

The following stage of the video compression process, quantization, discards information by grouping similar values together and transmitting only a representative value. This discards detail about exactly how bright an area is, or exactly what color it is. When one finds that a transformed component is near zero, zero is chosen for the representative value (denoting no change at a particular scale). One can omit sending zero and have the receiver assume zero as its default value. This helps compression by lowering the amount of data sent. Again, human visual sensitivity to levels is known to differ between luma and chroma.

Thus, one can take advantage of this fact by applying different levels of quantization to luma and chroma components, discarding more information from the chroma. When this different quantization is done following a temporal or 3-D transform, the effect is to reduce the temporal detail in the chroma band along with the spatial detail. In a typical case, for ordinary video material, the temporal transform results in low frequency components that are much larger than higher frequency components. Then, applying quantization to this transformed result groups the small values with zero, in effect getting them omitted from the compressed representation and lowering the temporal resolution of the chroma components.

Figure 2A:
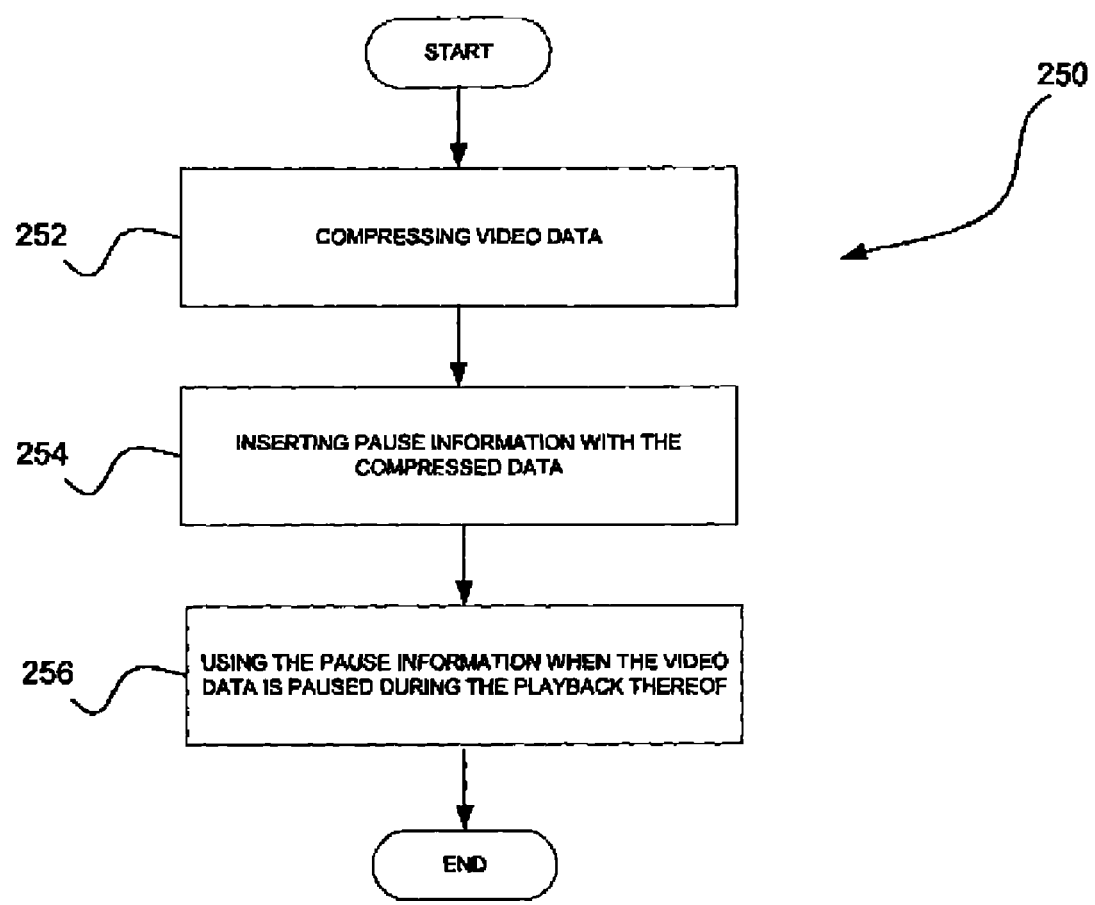
FIG. 2A illustrates a method for compressing data with a high-quality pause capability during playback, in accordance with one embodiment.

FIG. 2A illustrates a method 250 for compressing data with a high-quality pause capability during playback, in accordance with one embodiment. In one embodiment, the present method 250 may be carried out in the context of the framework of FIG. 1. It should be noted, however, that the method 250 may be implemented in any desired context.

In operation 252, video data is compressed. In one embodiment, the data compression may be carried out in the context of the coder portion 101 of the framework of FIG. 1. Of course, such compression may be implemented in any desired context.

In operation 254, pause information is inserted with the compressed data. In one embodiment, the pause information may be used to improve a quality of the played back video data. Moreover, the pause information may include a high-resolution frame. Still yet, the pause information may include data capable of being used to construct a high-resolution frame.

Thus, in operation 256, the pause information may be used when the video data is paused during the playback thereof. In the present method, the compressed video is equipped with a set of extra information especially for use when the video is paused. This extra information may include a higher-quality frame, or differential information that when combined with a regular compressed frame results in a higher-quality frame.

In order to keep the compression bit rate at a useful level, this extra information need not be included for every frame, but rather only for some frames. Typically, the extra information may be included for one frame of every 15 or so in the image, allowing a high-quality pause operation to occur at a time granularity of ½ second. This may be done in accord with observations of video pausing behavior. One can, however, include the extra information more often than this, at a cost in bit rate. One can also include it less often to get better compression performance, at a cost in user convenience. The tradeoff may be made over a range from two frames to 60 or more frames.

In one embodiment, the extra information may include a whole frame of the video, compressed using a different parameter set (for example, quantizing away less information) or using a different compression method altogether (for example, using JPEG-2000 within an MPEG stream). These extra frames may be computed when the original video is compressed, and may be carried along with the regular compressed video frames in the transmitted or stored compressed video.

In another embodiment, the extra information may include extra information for the use of the regular decompression process rather than a complete extra frame. For example, in a wavelet video compressor, the extra information might consist of a filter band of data that is discarded in the normal compression but retained for extra visual sharpness when paused. For another example, the extra information might include extra low-order bits of information from the transformed coefficients, and additional coefficients, resulting from using a smaller quantization setting for the chosen pausable frames.

In another embodiment, the extra information may include data for the use of a decompression process that differs from the regular decompression process, and is not a complete frame. This information, after being decompressed, may be combined with one or more frames of video decompressed by the regular process to produce a more detailed still frame.

More information regarding an exemplary wavelet-based transformation will now be set forth, which may be employed in combination with the various features of FIGS. 1-2A. It should be highly noted, however, that such wavelet-based transformation is set forth for illustrative purposes only and should not be construed as limiting in any manner. For example, it is conceived that the various features of FIGS. 1-2A may be implemented in the context of a DCT-based algorithm or the like.

Figure 3:
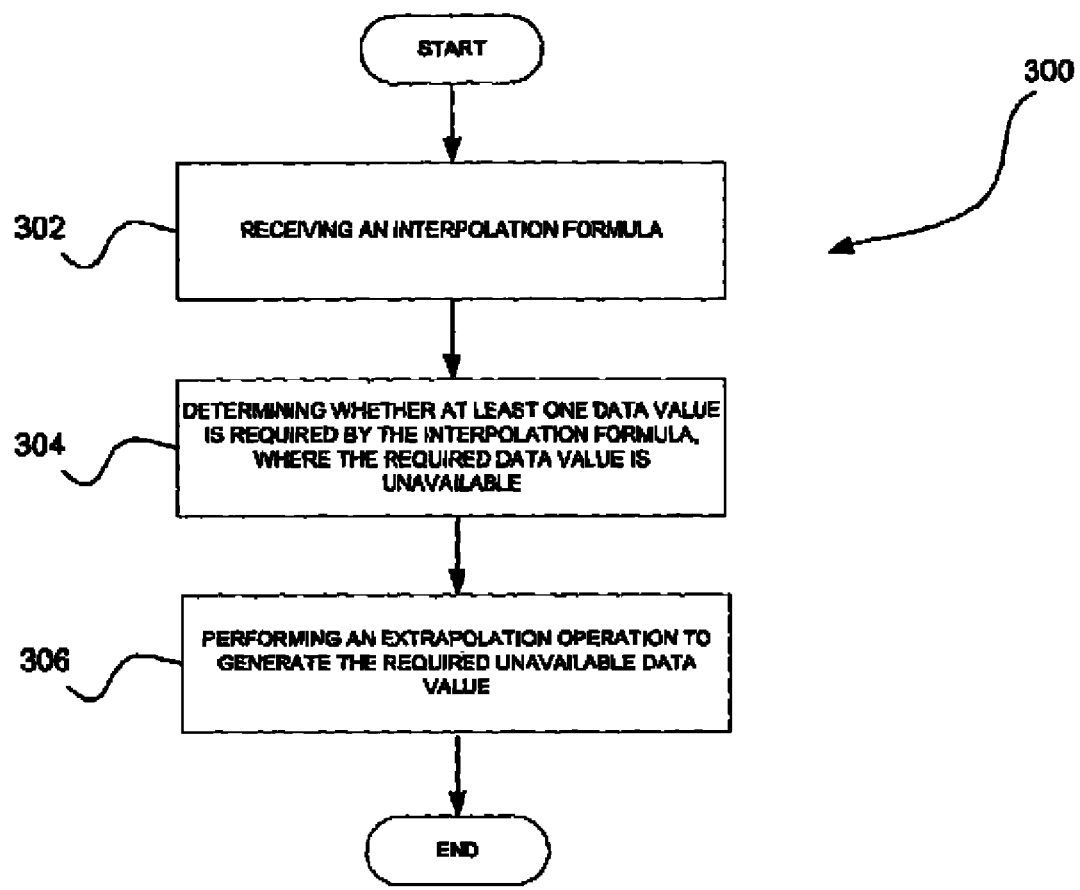
FIG. 3 illustrates a method for compressing/decompressing data, in accordance with one embodiment.

FIG. 3 illustrates a method 300 for compressing/decompressing data, in accordance with one embodiment. In one embodiment, the present method 300 may be carried out in the context of the transform module 102 of FIG. 1 and the manner in which it carries out a reversible transform. It should be noted, however, that the method 300 may be implemented in any desired context.

In operation 302, an interpolation formula is received (i.e. identified, retrieved from memory, etc.) for compressing data. In the context of the present description, the data may refer to any data capable of being compressed. Moreover, the interpolation formula may include any formula employing interpolation (i.e. a wavelet filter, etc.).

In operation 304, it is determined whether at least one data value is required by the interpolation formula, where the required data value is unavailable. Such data value may include any subset of the aforementioned data. By being unavailable, the required data value may be non-existent, out of range, etc.

Thereafter, an extrapolation operation is performed to generate the required unavailable data value. See operation 306. The extrapolation formula may include any formula employing extrapolation. By this scheme, the compression of the data is enhanced.

Figure 4:
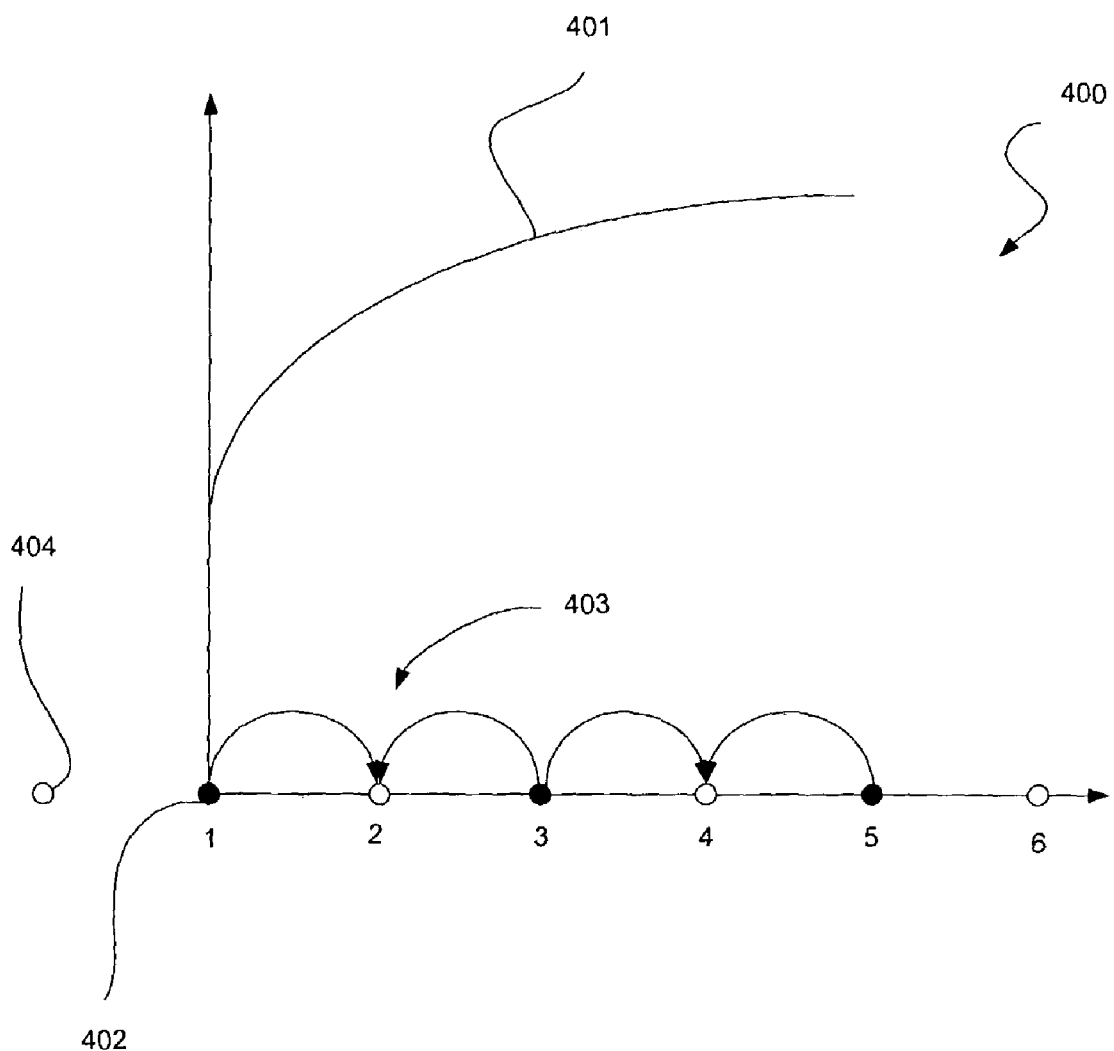
FIG. 4 shows a data structure on which the method of FIG. 3 is carried out.

FIG. 4 shows a data structure 400 on which the method 300 is carried out. As shown, during the transformation, a "best fit" 401 may be achieved by an interpolation formula 403 involving a plurality of data values 402. Note operation 302 of the method 300 of FIG. 3. If it is determined that one of the data values 402 is unavailable (see 404), an extrapolation formula may be used to generate such unavailable data value. More optional details regarding one exemplary implementation of the foregoing technique will be set forth in greater detail during reference to FIG. 5.

Figure 5:
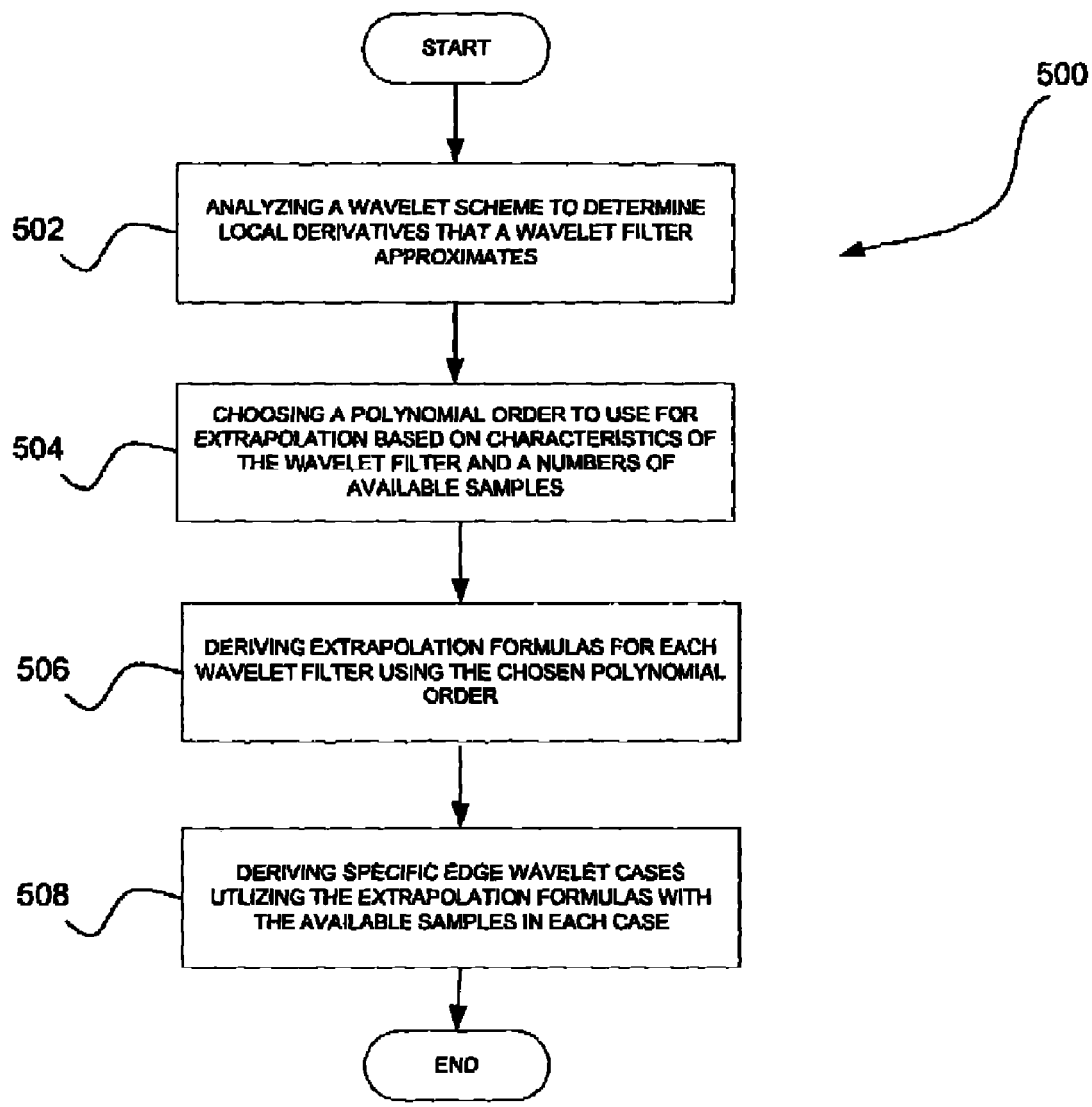
FIG. 5 illustrates a method for compressing/decompressing data, in accordance with one embodiment.

FIG. 5 illustrates a method 500 for compressing/decompressing data, in accordance with one embodiment. As an option, the present method 500 may be carried out in the context of the transform module 202 of FIG. 2 and the manner in which it carries out a reversible transform. It should be noted, however, that the method 500 may be implemented in any desired context.

The method 500 provides a technique for generating edge filters for a wavelet filter pair. Initially, in operation 502, a wavelet scheme is analyzed to determine local derivatives that a wavelet filter approximates. Next, in operation 504, a polynomial order is chosen to use for extrapolation based on characteristics of the wavelet filter and a numbers of available samples. Next, extrapolation formulas are derived for each wavelet filter using the chosen polynomial order. See operation 506. Still yet, in operation 508, specific edge wavelet cases are derived utlizing the extrapolation formulas with the available samples in each case.

Moreover, additional optional information regarding exemplary extrapolation formulas and related information will now be set forth in greater detail.

One of the transforms specified in the JPEG 2000 standard 1) is the reversible 5-3 transform shown in Equations #1.1 and 1.2.

Equations #1.1 and 1.2

$$Y_{2n+1} = X_{2n+1} - \left\lfloor \frac{X_{2n} + X_{2n+2}}{2} \right\rfloor \quad \text{eq. 1.1}$$

$$Y_{2n} = X_{2n} + \left\lfloor \frac{Y_{2n-1} + Y_{2n+1} + 2}{4} \right\rfloor \quad \text{eq. 1.2}$$

To approximate $Y_{2N-1}$ from the left, one may fit a quadratic polynomial from the left. Approximating the negative of half the 2nd derivative at 2N−1 using the available values yields Equation #1.1.R.

Equation #1.1.R $$Y_{2N-1} = -\frac{1}{3}\left(X_{2N-1} - \left\lfloor \frac{3X_{2N-2} - X_{2N-4} + 1}{2} \right\rfloor\right) \quad \text{eq 1.1.R}$$

Equation #1.1.R may be used in place of Equation #1.1 when point one is right-most. The apparent multiply by 3 can be accomplished with a shift and add. The division by 3 is trickier. For this case where the right-most index is 2N−1, there is no problem calculating $Y_{2N-2}$ by means of Equation #1.2. In the case where the index of the right-most point is even (say 2N), there is no problem with Equation #1.1, but Equation #1.2 involves missing values. Here the object is to subtact an estimate of Y from the even X using just the previously calculated odd indexed Ys, $Y_1$ and $Y_3$ in the case in point. This required estimate at index 2N can be obtained by linear extrapolation, as noted above. The appropriate formula is given by Equation #1.2.R.

Equation #1.2.R $$Y_{2N} = X_{2N} + \left\lfloor \frac{3Y_{2N-1} - Y_{2N-3} + 2}{4} \right\rfloor \qquad \text{eq 1.2.R}$$

A corresponding situation applies at the left boundary. Similar edge filters apply with the required extrapolations from the right (interior) rather than from the left. In this case, the appropriate filters are represented by Equations #1.1.L and 1.2.L.

Equations #1.1.L and 1.2.L $$Y_0 = -\frac{1}{3}\left(X_0 - \left\lfloor \frac{3X_1 - X_3 + 1}{2} \right\rfloor\right) \qquad \text{eq 1.1.L}$$

$$Y_0 = X_0 + \left\lfloor \frac{3Y_1 - Y_3 + 2}{4} \right\rfloor \qquad \text{eq 1.2.L}$$

The reverse transform fiters can be obtained for these extrapolating boundary filters as for the original ones, namely by back substitution. The inverse transform boundary filters may be used in place of the standard filters in exactly the same circumstances as the forward boundary filters are used. Such filters are represented by Equations #2.1.Rinv, 2.2.Rinv, 2.1.L.inv, and 2.2.L.inv.

Equations #2.1.Rinv, 2.2.Rinv, 2.1.L.inv, 2.2.L.inv $$X_{2N-1} = -3Y_{2N-1} + \left\lfloor \frac{3X_{2N-2} - X_{2N-4} + 1}{2} \right\rfloor \qquad \text{eq 2.1.R inv}$$

$$X_{2N} = Y_{2N} - \left\lfloor \frac{3Y_{2N-1} - Y_{2N-3} + 2}{4} \right\rfloor \qquad \text{eq 2.2.R inv}$$

$$X_0 = -3Y_0 + \left\lfloor \frac{3X_1 - X_3 + 1}{2} \right\rfloor \qquad \text{eq 2.1.L inv}$$

$$X_0 = Y_0 - \left\lfloor \frac{3Y_1 - Y_3 + 2}{4} \right\rfloor \qquad \text{eq 2.2.L inv}$$

Thus, one embodiment may utilize a reformulation of the 5-3 filters that avoids the addition steps of the prior art while preserving the visual properties of the filter. See for example, Equations #3.1, 3.1R, 3.2, 3.2L.

Equations #3.1, 3.1R, 3.2, 3.2L $$Y_{2n+1} = (X_{2n+1} + 1/2) - \left\lfloor \frac{(X_{2n} + 1/2) + (X_{2n+2} + 1/2)}{2} \right\rfloor \qquad \text{eq 3.1}$$

$$Y_{2N+1} = (X_{2N+1} + 1/2) - (X_{2N} + 1/2) \qquad \text{eq 3.1R}$$

-continued $$(Y_{2n} + 1/2) = (X_{2n} + 1/2) + \left\lfloor \frac{Y_{2n-1} + Y_{2n+1}}{4} \right\rfloor \qquad \text{eq 3.2}$$

$$(Y_0 + 1/2) = (X_0 + 1/2) + \left\lfloor \frac{Y_1}{2} \right\rfloor \qquad \text{eq 3.2L}$$

In such formulation, certain coefficients are computed with an offset or bias of ½, in order to avoid the additions mentioned above. It is to be noted that, although there appear to be many additions of ½ in this formulation, these additions need not actually occur in the computation. In Equations #3.1 and 3.1R, it can be seen that the effects of the additions of ½ cancel out, so they need not be applied to the input data. Instead, the terms in parentheses $(Y_0+½)$ and the like may be understood as names for the quantities actually calculated and stored as coefficients, passed to the following level of the wavelet transform pyramid.

Just as in the forward case, the JPEG-2000 inverse filters can be reformulated in the following Equations #4.2, 4.2L, 4.1, 4.1R.

Equations #4.2, 4.2L, 4.1, 4.1R $$(X_{2n} + 1/2) = (Y_{2n} + 1/2) - \left\lfloor \frac{Y_{2n-1} + Y_{2n+1}}{4} \right\rfloor \qquad \text{eq 4.2}$$

$$(X_0 + 1/2) = (Y_0 + 1/2) - \left\lfloor \frac{Y_1}{2} \right\rfloor \qquad \text{eq 4.2L}$$

$$(X_{2n+1} + 1/2) = Y_{2n+1} + \left\lfloor \frac{(X_{2n} + 1/2) + (X_{2n+2} + 1/2)}{2} \right\rfloor \qquad \text{eq 4.1}$$

$$(X_{2N+1} + 1/2) = Y_{2N+1} + (X_{2N} + 1/2) \qquad \text{eq 4.1R}$$

As can be seen here, the values taken as input to the inverse computation are the same terms produced by the forward computation in Equations #3.1~3.2L and the corrections by ½ need never be calculated explicitly.

In this way, the total number of arithmetic operations performed during the computation of the wavelet transform is reduced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for compressing video data comprising:
updating luminescence data of a frame at a first predetermined rate; and
updating chrominance data of the frame at a second predetermined rate that is less than the first predetermined rate;
wherein one or more frequency bands of the chrominance data is omitted utilizing a wavelet filter.

2. The method as recited in claim 1, and further comprising interpolating omitted portions of the chrominance data upon decompression of the video data.

3. A computer program product embodied on a computer readable medium for compressing video data, comprising:
computer code for updating luminescence data of a frame at a first predetermined rate; and computer code for updating chrominance data of the frame at a second predetermined rate that is less than the first predetermined rate;

wherein one or more frequency bands of the chrominance data is omitted utilizing a wavelet filter.

4. The computer program product as recited in claim 3, and further comprising interpolating omitted portions of the chrominance data upon decompression of the video data.

* * * * *